US011254388B2

(12) United States Patent
Hoppach (10) Patent No.: US 11,254,388 B2
(45) Date of Patent: Feb. 22, 2022

(54) HYBRID DRIVE FOR AN ELECTRIC BICYCLE

(71) Applicant: BROSE ANTRIEBSTECHNIK GMBH & CO. KOMMANDITGESELLSCHAFT, BERLIN, Berlin (DE)

(72) Inventor: Elmar Hoppach, Wuerzburg (DE)

(73) Assignee: BROSE ANTRIEBSTECHNIK GMBH & CO. KOMMANDITQESELLSCHAFT, BERLIN, Berlin (DE)

( * ) Notice: Subject to any disclaimer, the term of this patent is extended or adjusted under 35 U.S.C. 154(b) by 553 days.

(21) Appl. No.: 16/171,676

(22) Filed: Oct. 26, 2018

(65) Prior Publication Data

US 2019/0127024 A1     May 2, 2019

(30) Foreign Application Priority Data

Oct. 27, 2017   (DE) .......................... 102017219398.0

(51) Int. Cl.
    *B62M 23/02*    (2010.01)
    *B62M 11/14*    (2006.01)
    (Continued)

(52) U.S. Cl.
    CPC .............. *B62M 23/02* (2013.01); *B62M 6/45* (2013.01); *B62M 6/55* (2013.01); *B62M 11/14* (2013.01);
    (Continued)

(58) Field of Classification Search
    CPC .......... B62M 23/02; B62M 6/45; B62M 6/55; B62M 11/14; B62M 11/145
    See application file for complete search history.

(56) References Cited

U.S. PATENT DOCUMENTS

2001/0008859 A1    7/2001   Masaki
2012/0012412 A1    1/2012   Moeller et al.
(Continued)

FOREIGN PATENT DOCUMENTS

DE         10250645 A1     7/2003
DE      102009045447 A1    6/2010
(Continued)

OTHER PUBLICATIONS

Extended European Search Report for European Application No. EP 18202271.5, dated Jun. 27, 2019, 21 pages.
(Continued)

*Primary Examiner* — Minnah L Seoh
*Assistant Examiner* — Harold Eric Pahlck, III
(74) *Attorney, Agent, or Firm* — Brooks Kushman P.C.

(57) ABSTRACT

A hybrid drive for an electric bicycle comprising a pedal crank drive that contains a pedal crank axle connected to pedal cranks at both ends, an electromotive drive electrically connected to an accumulator, which contains two electric motors that are connected to different transmission elements of a superposition transmission, which on the drive side is connected to the pedal crank drive and on the output side is connected to the sprocket of a chain drive of the electric bicycle recuperative electromotive braking of the electric bicycle with charging of the accumulator.

17 Claims, 2 Drawing Sheets

(51) Int. Cl.
  *B62M 6/45* (2010.01)
  *B62M 6/55* (2010.01)
  *B62M 6/50* (2010.01)
  *B62M 6/80* (2010.01)
(52) U.S. Cl.
  CPC ............. *B62M 11/145* (2013.01); *B62M 6/50* (2013.01); *B62M 6/80* (2013.01)

(56) References Cited

U.S. PATENT DOCUMENTS

| | | | | |
|---|---|---|---|---|
| 2014/0166386 | A1* | 6/2014 | Arimune | B62M 6/45 180/206.3 |
| 2016/0107719 | A1 | 4/2016 | Hosaka et al. | |
| 2016/0318577 | A1* | 11/2016 | Hayslett | B62M 6/55 |
| 2017/0183056 | A1* | 6/2017 | Yamamoto | F16H 63/50 |
| 2017/0217537 | A1 | 8/2017 | Yamamoto | |
| 2017/0259883 | A1* | 9/2017 | Yamamoto | F16H 3/725 |
| 2017/0276217 | A1 | 9/2017 | Nichols | |
| 2017/0291660 | A1* | 10/2017 | Deleval | B62M 6/50 |
| 2020/0198727 | A1* | 6/2020 | Deleval | B62M 11/145 |

FOREIGN PATENT DOCUMENTS

| | | | |
|---|---|---|---|
| DE | 102010009649 | A1 | 9/2011 |
| DE | 102010028645 | A1 | 11/2011 |
| DE | 102013012534 | A1 | 1/2015 |
| DE | 102016111754 | A1 | 1/2017 |
| DE | 102016211000 | A1 | 1/2017 |
| DE | 102016224314 | A1 | 6/2017 |
| DE | 102016003784 | A1 | 10/2017 |
| EP | 1298050 | A1 | 4/2003 |
| EP | 1642820 | B1 | 8/2007 |
| EP | 1967446 | A1 | 9/2008 |
| EP | 2218634 | A1 | 8/2010 |
| EP | 2480446 | B1 | 2/2014 |
| EP | 2755887 | B1 | 9/2015 |
| EP | 2921396 | B1 | 12/2017 |
| JP | H10138986 | A | 5/1998 |
| JP | 2016182851 | A | 10/2016 |
| KR | 20140022333 | A | 2/2014 |
| WO | 03066421 | A1 | 8/2003 |
| WO | 2013160477 | A1 | 10/2013 |
| WO | 2016034574 | A1 | 3/2016 |

OTHER PUBLICATIONS

Partial European Search Report for Application No. EP 18202271.5, dated Apr. 9, 2019, 19 pages.

Notice of Opposition to a European Patent, Application No. EP 18202271.5, dated Jun. 11, 2021, 20 pages.

* cited by examiner

Fig. 1

Fig. 2

HYBRID DRIVE FOR AN ELECTRIC BICYCLE

CROSS-REFERENCE TO RELATED APPLICATIONS

This application claims priority to German Patent Application No. 10 2017 219 398.0 filed Oct. 27, 2017, the entire disclosure of which is incorporated by reference herein.

TECHNICAL FIELD

The present disclosure relates to a hybrid drive for an electric bicycle and a method for operating a hybrid drive for an electric bicycle.

BACKGROUND

A hybrid drive for an electric bicycle, comprising a pedal crank drive, an electromotive drive electrically connected to an accumulator, and a transmission which on the output side is connected to a sprocket of a chain drive of the electric bicycle in principle provides for three operating conditions:
 a bicycle mode with the sole actuation of the pedal crank drive by means of muscular force,
 an E-bike mode with a sole electromotive drive, or
 a pedelec mode with electromotively assisted actuation by muscular force.

From DE 10 2009 045 447 A1 a bicycle with an electric auxiliary drive is known, which includes an electric motor, a battery connected to the electric motor for storing electric energy, a crank drive with pedal cranks that are attached to a pedal crank axle rotatably arranged about a crank axis, and a planetary transmission for driving the bicycle both by the electric motor and by muscular force of a driver. The planetary transmission and the electric motor connected to a sun gear of the planetary transmission via a hollow shaft are arranged about the pedal crank axle of the crank drive extending within the hollow shaft, which crank drive is connected either to a planet carrier or to the internal gear of the planetary transmission. For torque optimization, the bicycle can include a shifting system configured as a derailleur or hub transmission.

For braking electric bicycles mechanically actuatable or mechanically acting shoe, disc or backpedal brakes are used, by means of which the kinetic energy of the electric bicycle is converted into thermal energy and hence destroyed. To recover a part of this kinetic energy when braking the electric bicycle and thereby increase the range of the electromotive drive depending on the state of charge of the accumulator, it is known to start a recuperation mode by actuating a handbrake lever, in which the kinetic energy of the electric bicycle is converted into electric energy via the electromotive drive then operating in the generator mode and can be stored in the accumulator of the electromotive drive.

To precisely actuate the electrically acting brake, it is known from DE 10 2010 028 645 A1 to use the pedal actuation executed by the user of the electric bicycle for adjusting a desired recuperation mode, an electric brake or the drive mode. During pedal actuation, a backward movement or a pedal torque and/or a pedal speed of the pedals of the pedal crank drive is used, as it occurs in brake actuations of a conventional backpedal brake of a bicycle. By a backward movement of the pedals of the pedal crank drive an electric braking operation and a recuperation with or without mechanical braking, for example by means of a backpedal brake, thus can be carried out.

Besides bicycles with a shifting system for optimizing the torque output by the pedal crank drive, single-speed bicycles with freewheel as well as single-speed bicycles without freewheel, so-called "fixies", are known. Due to the rigid coupling between the pedal crank drive and the driven wheel it is also possible to drive backwards with the latter, to hold the bicycle in position via the pedals of the pedal crank drive, and to brake by exerting back pressure on the pedals, so that possibly additional brakes—as prescribed in track cycling, artistic cycling and bicycle polo—can be omitted. It is attempted to also use an electromotive drive in such single-speed bicycles without freewheel in order to support and expand the function of the pedal crank drive as well as for electrical braking and for recuperation.

From EP 1 642 820 B1 a drive system with electrically variable gear ratio is known, which includes a drive pinion connected to a drive shaft and an output-side hub, in which two planetary transmissions each with a first and a second sun gear, first and second planetary gears rotatably arranged about axes on a first and a second planet carrier and consisting of two stepped gear wheels of small and large diameter, and a first and a second internal gear as well as a first and a second electric motor each operating in the motor or generator mode are contained. The first sun gear rotating about an axis and connected to the rotor of the first electric motor meshes with the large-diameter gear wheels of the first planetary gears, while the small-diameter gear wheels mesh with the internal toothing of the first internal gear. The first planet carrier is connected to the drive shaft.

The second sun gear likewise rotating about the axis and connected to the rotor of the second electric motor meshes with the large-diameter gear wheels of the second planetary gears, whose small-diameter gear wheels mesh with the stationary second internal gear, while the second planet carrier is firmly connected to the output-side hub. The first planetary gears thus rotate in synchronism with the second planet carrier, but at a different speed.

The stator of the first electric motor is stationarily connected to the axis, and the stator of the second electric motor is stationarily connected to the second internal gear.

In operation of this drive system the one of the two electric motors operates as a generator and outputs electric power to the other electric motor operating as a motor, wherein the magnitude of the electric power is determined by a control device which thus also determines the speed at which the electric motor operating as a motor rotates, so that the rotational speed of the output-side hub can be varied independent of the rotational speed of the drive shaft. In a bicycle with a hybrid drive, the control device can additionally output electric power to the one or other electric motor in order to support the drive power applied by the user.

SUMMARY

According to an embodiment, a hybrid drive for an electric bicycle is of simple and inexpensive construction with few components, which has small dimensions for installation into a bicycle frame and is universally usable in bicycles with and without freewheel for the variably switchable gear ratio, for the recuperating drive and for braking with high efficiency as well as for controlling the various operating modes via an interface, and is suitable for use in a training apparatus or in a medical apparatus for rehabilitation.

This object is solved by a hybrid drive for an electric bicycle with features as described herein and by a method for operating such a hybrid drive for an electric bicycle with features as described herein.

The hybrid drive for an electric bicycle may include a pedal crank drive that contains a pedal crank axle connected to pedal cranks at both ends, an electromotive drive electrically connected to an accumulator, which comprises two electric motors that are connected to different transmission elements of a superposition transmission that on the drive side is connected to the pedal crank drive and on the output side is connected to the sprocket of the chain drive of the electric bicycle.

With this configuration of the hybrid drive for an electric bicycle it is possible to use one electric motor or both electric motors as an electromotive drive, depending on the operating mode of the electric bicycle. In the operating mode "energy recovery" or recuperation in an electric bicycle without freewheel both electric motors are utilized for recuperation. This results in high drive power and a high efficiency, which among other things results in a long range of an electric bicycle.

Due to the similar or identical configuration of the first and the second electric motor arranged parallel to the pedal crank axle and connected to the first and the second spur gear of a first and a second reduction gear unit, the same space-saving electric motors can be used so that an inexpensive construction is ensured. As the first and second spur gears mesh with a first and a second gear wheel of the first and the second reduction gear unit arranged coaxially to the pedal crank axle and have a different number of teeth, the first and the second gear wheel can be of similar construction, which likewise provides for an inexpensive construction with identical components.

In at least one embodiment, the superposition transmission may include a planetary transmission having a sun gear, an internal gear arranged coaxially to the sun gear, and at least one planetary gear that engages the sun gear and the internal gear and is rotatably arranged on a planetary gear carrier, wherein in a first embodiment the first gear wheel is connected to the sun gear and the second gear wheel is connected to the pedal crank axle, which is coupled to the planetary gear carrier, and wherein on the output side the internal gear of the planetary transmission is connected to the sprocket.

In an alternative embodiment, the first gear wheel is connected to the sun gear and the second gear wheel is connected to the pedal crank axle, which is coupled to the internal gear, while on the output side the planetary gear carrier of the planetary transmission is connected to the sprocket.

For detecting the pedaling frequency and pedal position or angular position of the pedal crank axle of the pedal crank drive actuated by the user a rotor position encoder is connected to the pedal crank axle, which may consist of an optical or magnetic sensor that contains the second gear wheel of the second reduction gear unit connected to the pedal crank axle as a position encoder.

For adjusting different operating modes of the bicycle with and without freewheel and/or backpedal function, the hybrid drive includes a preferably programmable control device supplied with the actual values of the electric motors and outputting setpoint values to the electric motors and connected to an input and display device, wherein the input and display device is formed of a turning handle which may be arranged on the handlebar of the bicycle, consists of a rocker switch or a touch-sensitive display, and optionally is configured as a wireless interface.

A method for operating a hybrid drive for an electric bicycle with and without freewheel function provides for the operating modes
  drive of the electric bicycle by actuating the pedal crank drive with and without support by the electromotive drive,
  drive of the electric bicycle only by the electromotive drive,
  stepless change of the gear ratio of the drive train from the pedal crank drive to the sprocket by means of the electromotive drive,
  electromotive braking of the electric bicycle,
  recuperative electromotive braking of the electric bicycle with charging of the accumulator.

The adjustment of the operating mode desired by the user of the electric bicycle is effected either on the input and display device connected to the control device or by the kind of actuation of the electric bicycle by the user.

In an electric bicycle without freewheel the intensity of the recuperative braking is varied in particular in dependence on the intensity of the counter torque exerted by the user on the pedals of the pedal cranks against the direction of rotation of the pedal crank drive for a forward movement, while in an electric bicycle with freewheel and backpedal brake the intensity of the recuperative braking is varied by the intensity of the backpedal force exerted by the user on the pedals of the pedal cranks against the direction of rotation of the pedal crank drive for a forward movement.

In at least one embodiment, the power output by the user to the pedal crank drive is adjusted independent of the respective driving condition of the electric bicycle, and in dependence on the respective driving condition of the electric bicycle in the motor mode drive power is output from the electromotive drive to the sprocket, or in the generator mode electric power is output from the electromotive drive to the accumulator.

The torque output by the user to the pedal crank axle may be determined from the Q component of the motor current of the field-oriented controlled first electric motor with respect to the Q component of the motor current of the field-oriented controlled second electric motor by taking account of the gear ratios of the electric motors and the gear ratio of the planetary transmission.

In one or more embodiments, recuperating braking involves the build-up of a rising pedal reaction moment via the second electric motor by turning back the pedal crank drive from standstill, which pedal reaction moment corresponds to the braking moment, wherein the recuperation of electric energy is effected via the first electric motor operating in the generator mode.

In an electric bicycle without freewheel function according to a further embodiment the gear ratio from the pedal crank drive to the sprocket can be adjusted steplessly or in steps by means of the input and display device.

Both in an electric bicycle with freewheel function and in an electric bicycle without freewheel function the amplification of the power output by the user to the pedal crank axle in an electric bicycle without freewheel function possibly can be adjusted by taking account of the gear ratio adjusted on the input and display device by means of the input and display device.

Both methods described above provide for determining the pedaling power of the user without expensive torque sensors for detecting the pedaling power exerted on the pedal crank axle.

In an electric bicycle without freewheel function a mechanical freewheel can be reproduced by determining the position of the rotor of the second electric motor and by tracking the rotational speed of the sprocket connected to the rotor of the first electric motor.

The hybrid drive as described herein can also be used for training and therapeutic purposes. Among other things, a constant physical load of the user for a cardiological training of the user can be effected by specifying the setpoint value of the drive power output by the electromotive drive in dependence on the heart rate of the user so that with rising heart rate a rising electromotive drive power, and with decreasing heart rate a reduced electromotive drive power is output from the electromotive drive to the superposition transmission. Not only by supplying electric power can the load of the user be avoided, but due to electric braking pedaling is also possible when driving downhill, and the heart rate thus can be kept in the training range.

BRIEF DESCRIPTION OF THE DRAWINGS

Embodiments illustrated in the drawings will be explained in detail.

DETAILED DESCRIPTION

The multifunctional hybrid drive schematically shown in FIGS. 1 to 4 includes two electric motors 2, 3 arranged in a housing 1, which each operate in the motor or generator mode, and a pedal crank axle 5 for actuation by a user by means of muscular force, which at its ends contains pedal crank receptacles 51, 52 for pedal cranks provided with pedals at their opposite ends. The first electric motor 2 is connected to a first reduction gear 21, 22, which contains a first spur gear 21 connected to the rotor of the first electric motor 2 and a first gear wheel 22 meshing with the first spur gear 21 and reduces the rotor speed by the gear ratio of the first spur gear 21 to the first gear wheel 22.

The toothing of the first gear wheel 22 meshes with the toothing of a sun gear 41 of a planetary transmission 4 (planetary gearset), which beside the sun gear 41 includes at least one planetary gear 42 (planet gear) rotatably mounted on an axle of a planetary gear carrier 43 (planet carrier), which is in toothing engagement with the sun gear 41, and an internal gear 44 (ring gear) with whose internal toothing meshes with the external toothing of at least one planetary gear 42.

The rotor of the second electric motor 3 is connected to a second spur gear 31 of a second reduction gear 31, 32, which meshes with a second gear wheel 32 that is firmly connected to the pedal crank axle 5. The reduction of the rotor speed of the second electric motor 3 is determined by the gear ratio between the second spur gear 31 and the second gear wheel 32 of the reduction gear 31, 32.

Figure 1:
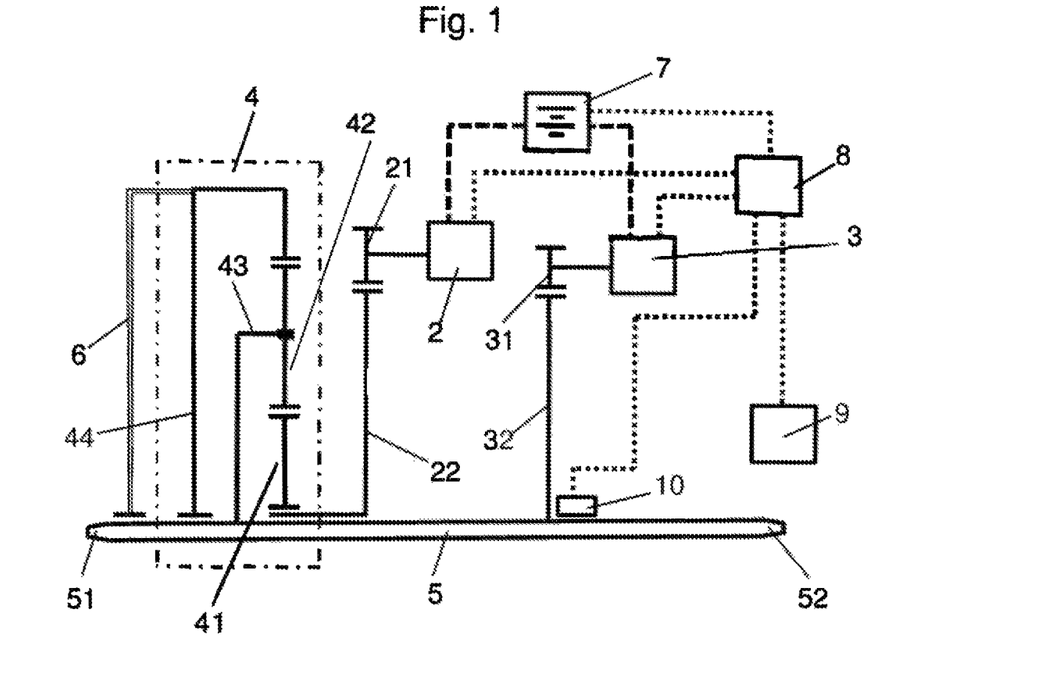
FIG. 1 is a schematic diagram of a hybrid drive of an electric bicycle.

In the first embodiment schematically shown in FIG. 1 the internal gear 44 of the planetary transmission 4 is coupled to an output-side sprocket 6, which in a manner known per se is connected to a drive pinion usually arranged at the rear wheel of an electric bicycle via a chain. The planetary gear carrier 43 in this embodiment is connected to the pedal crank axle 5.

Figure 2:
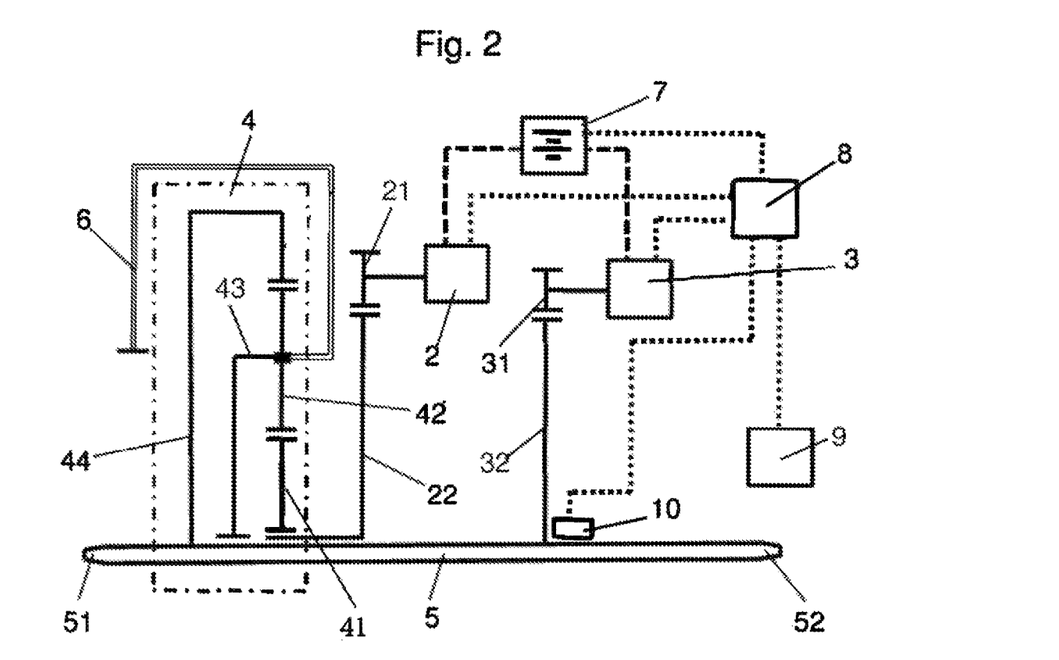
FIG. 2 is a schematic diagram of a hybrid drive of an electric bicycle according to an alternative embodiment.

In the second embodiment schematically shown in FIG. 2 the planetary gear carrier 43 of the planetary transmission 4 is coupled to the output-side sprocket 6, while the internal gear 44 of the planetary transmission 4 in this embodiment is connected to the pedal crank axle 5.

In both embodiments schematically shown in FIGS. 1 and 2, the two electric motors 2, 3 are connected to an accumulator 7 corresponding to the broken lines, from which they are fed with electric energy in the motor mode or into which they feed electric energy in the generator mode. Dotted lines represent control lines for controlling the energy flow between the electric motors 2, 3 and the accumulator 7 by means of a control device 8, wherein the connection of the control device 8 to the accumulator 7 substantially serves for monitoring the state of charge of the accumulator 7. Furthermore, via a line likewise shown as a dotted line the control device 8 is connected to an input and display device 9, which for example is arranged on the handlebar of the electric bicycle and allows the user to adjust the various operating modes of the hybrid drive. Via a sensor line likewise shown as a dotted line, the control device 8 additionally is connected to an incremental rotor position encoder 10 configured as a magnetic or optoelectronic sensor, which is arranged on the pedal crank axle 5 and serves for determining the pedaling frequency of the user and the position of the pedal crank axle 5 or of the pedals connected to the pedal crank axle 5 via pedal cranks and for this purpose utilizes the toothing of the second gear wheel 32.

The determination of the torque exerted by the user on the pedal crank drive is effected from the Q component of the motor current of the field-oriented controlled first electric motor 2 minus the Q component of the motor current of the likewise field-oriented controlled second electric motor 3 without any further sensor system.

Figure 3:
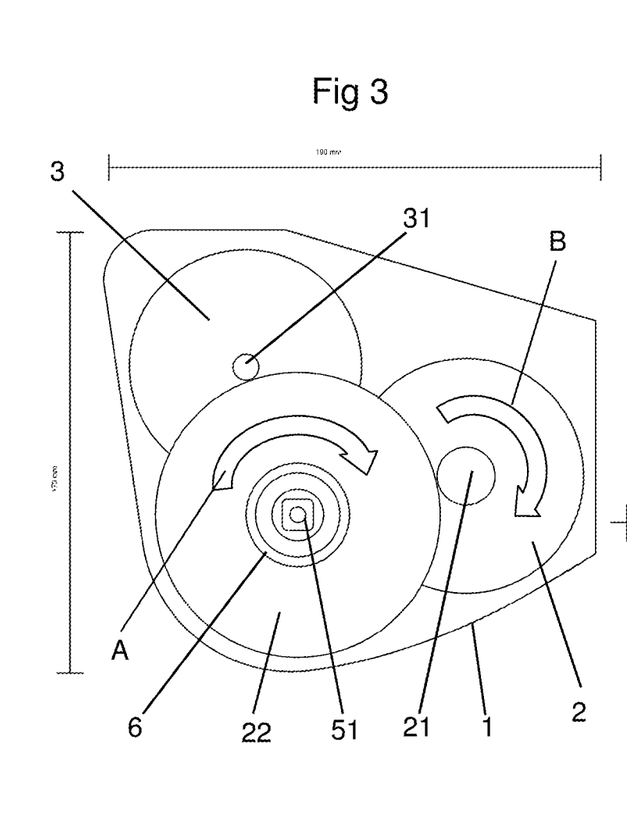
FIG. 3 shows a schematic side view of the hybrid drive according to FIGS. 1 and 2.
Figure 4:
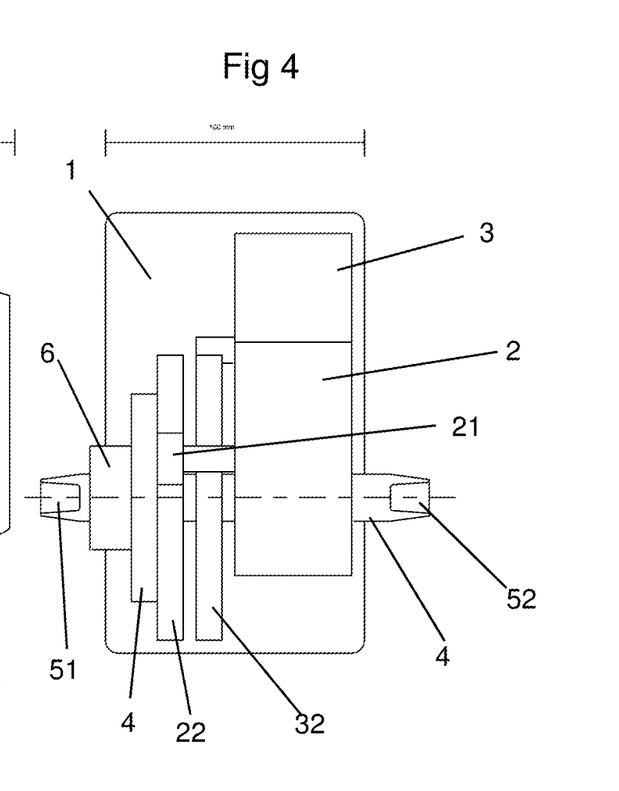
FIG. 4 shows a schematic longitudinal section through the hybrid drive according to FIGS. 1 to 3.

FIGS. 3 and 4 show schematic representations of the spatial arrangement of the hybrid drive within the housing 1 and illustrate the space-saving configuration of the arrangement of the two electric motors 2, 3 each operating in the motor and/or generator mode and of the transmission elements of the reduction gear units 21, 22 and 31, 32 and of the superposition or planetary transmission 4 within the housing 1.

The hybrid drive shown in FIGS. 1 to 4 provides for the following operating modes for electric bicycles:

a) with and without freewheel:
  driving mode with electromotive drive and pedal crank drive with control/adjustment of the electromotive drive to support the pedal crank drive
  stepless gear shift
b) with freewheel
  electromotive braking with and without recuperation ("electric braking") by adjustment on the input and display device,
  electromotive braking with and without recuperation by actuating mechanical brakes, for example by actuating a backpedal brake
c) without freewheel
  electromotive braking with and without recuperation by a torque exerted on the pedal crank drive and directed against the forward direction of rotation
d) fitness and rehabilitation bicycle In the following, part of these operating modes will be explained in detail with reference to the embodiments according to FIGS. 1 to 4. A first functional description relates to the driving mode and a stepless shifting system in the manner of a NuVinci hub according to a) the aforementioned operating modes applicable in electric bicycles with and without freewheel.

As described above, the hybrid drive includes two preferably identical electric motors 2, 3 each operating in the motor and/or generator mode, which with different spur gears 21, 31 act on the gear wheels 22, 32 arranged coaxially to the pedal crank axle 5. While the first gear wheel 22 connected to the rotor of the first electric motor 2 is connected to the sun gear 41 of the downstream planetary transmission 4, the second gear wheel 32 connected to the rotor of the second electric motor 3 acts on the pedal crank axle 5, which either is connected to the internal gear 44 according to FIG. 2 or to the planetary gear carrier 43 according to FIG. 1. The output of the planetary transmission 4 to the sprocket 6 is effected either via the internal gear 44 or via the planetary gear carrier 43, wherein the sprocket 6 drives the rear wheel of the electric bicycle for example via a chain or a belt.

In the driving mode, the user driving the pedal crank axle 5 by stepping on the pedals and the second electric motor 3 drive the internal gear 44 of the planetary transmission 4 connected to the pedal crank axle 5 and the second gear wheel 32, while the first electric motor 2 drives the sun gear 41 of the planetary transmission 4 via the first gear wheel 22, which sun gear is coupled to the planetary gears 42, whereby the planetary gear carrier 43 rotates, which in the embodiment according to FIG. 2 is connected to the sprocket 6.

As with an increase of its rotational speed the first electric motor 2 increases the rotational speed and hence velocity of the sprocket 6, wherein the rotational speed of the planetary gear carrier 43 results from the sum of the rotational speeds of the sun gear 41 and the internal gear 44, the first electric motor 2 effects a change of the gear ratio from the pedal crank axle 5 to the sprocket 6 by changing its rotational speed with respect to the rotational speed of the pedal crank axle 5 as determined by the pedaling frequency of the user. A fixed, but variable gear ratio as described above can be specified via the input and display device 9.

The second electric motor 3 connected to the pedal crank axle 5 supports the rotation of the pedal crank axle 5 so that the desired drive support, i.e. the fraction of the electromotive drive power relative to the power of the pedal crank drive or to the total power output to the sprocket 6 is adjusted.

Beside the support of the pedal crank power the second electric motor 3 also serves the electromotive braking with and without a recuperation of electric energy, which is fed back into the accumulator 7 or output to the first electric motor 2, for example when the user shuts off an electromotive support on the input and display device 9, the accumulator 7 is to be charged in the driving mode, for example also when driving downhill, or the accumulator 7 has only little charge or is discharged, but the user wants to use the stepless gear shift, which requires the further feeding of the first electric motor 2.

For electromotive braking without a recovery of electric energy in an electric bicycle with freewheel, the so-called electric braking, a braking moment is built up by adjustment on the input and display device 9 or by backpedaling the pedals, wherein the pedal crank axle 5 and the second electric motor 3 stand still, but the sprocket 6 and the first electric motor 2 run on in forward direction in the direction of the arrows A and B depicted in FIG. 4. The first electric motor 2 applies a braking moment which the user must support via the pedals, which corresponds to the behavior of a backpedal brake.

In an electric bicycle with freewheel and backpedal function the same conditions are obtained on actuation of the backpedal brake so that the mechanical braking effect is supported by the electric braking effect.

During recuperating braking in an electric bicycle with freewheel as well as with and without backpedal function, a rising pedal reaction moment is built up via the second electric motor 3 operatively connected to the pedal crank axle 5 when turning back the pedals, which pedal reaction moment corresponds to the braking moment. Feeding electric energy back into the accumulator 7—as described above—is effected by the first electric motor 2 running in the generator mode.

By means of electromotive braking or the "electric backpedal brake" a wear-free brake with recuperation is provided, which increases the range of an electric bicycle by double-digit percentages.

In an electric bicycle without freewheel or with fixed gear ratio (so-called "fixie"), i.e. a rigid connection of the rear wheel to the sprocket 6 without freewheel hub, the pedals are permanently rotated in the driving mode of the electric bicycle. The hybrid drive according to an embodiment provides for a reproduction of the mechanical freewheel by determining the position of the rotor of the second electric motor 3 and by tracking the rotational speed of the sprocket 6 by the first electric motor 2 according to $$n_2 = \frac{\frac{Zs}{Zh}}{\frac{ZsZ21}{ZhZ32}} n_6$$

wherein $n_2$ is the rotational speed of the first electric motor 2, Zs is the number of teeth of the sun gear 41, Zh is the number of teeth of the internal gear 44, $Z_{21}$ is the number of teeth of the first spur gear 21, $Z_{32}$ is the number of teeth of the second gear wheel 32 and $n_6$ is the rotational speed of the sprocket 6. There is preferably used a planetary transmission 4 with a ratio of the number of teeth of the sun gear 41 to the number of teeth of the internal gear 44 of 1:2.9 to 1:3.2.

For braking the electric bicycle a negative torque, i.e. a torque directed against the torque required for driving forwards, must be applied by the user at the rotating pedals. In this recuperating braking mode the user-side braking moment is intensified by the second electric motor 3, wherein the advantage lies in the regenerative power flow over both electric motors 2, 3. The gear ratio is defined by specifying the rotational speed n2 of the first electric motor 2 with the rotational speed of the pedaling frequency exerted by the user on the pedal crank axle 5 as detected via the second electric motor 3, wherein the pedaling frequency of the user is translated into the rotational speed of the sprocket 6 with $$ü = \frac{Zs}{Zh} + 1$$

wherein Zs represents the number of teeth of the sun gear 41 and Zh represents the number of teeth of the internal gear 44. The planetary transmission supplies the rotational speed $n_2$ with the gear ratio $$\ddot{u} = \frac{Z_s Z_{21}}{Z_h Z_{32}}$$

which for a step-up ratio with the factor ü=2 for example results in a rotational speed $n_2$ of the first electric motor 2 of $$n_2 = \frac{\frac{Z_s}{Z_h}+1}{\frac{Z_s Z_{21}}{Z_h Z_{32}}} n_{user}$$

with Zs representing the number of teeth of the sun gear 41, Zh the number of teeth of the internal gear 44, $Z_{21}$ the number of teeth of the first spur gear 21, $Z_{32}$ the number of teeth of the second gear wheel 32 and $n_{user}$ the rotational speed or pedaling frequency output by the user to the pedal crank axle 5 or the sprocket 6.

For a step-down ratio the first electric motor 2 must change its direction of rotation, so that the output speed is decreased. A step-down ratio of the drive with ü=0.5 results in a rotational speed $n_2$ of the first electric motor 2 in dependence on the pedaling frequency $n_{user}$ of $$n_2 = -\frac{1}{2}\frac{\frac{Z_s}{Z_h}+1}{\frac{Z_s Z_{21}}{Z_h Z_{32}}} n_{user}$$

In this embodiment a step-down and step-up ratio of u=0.5-2 already leads to a spread of the transmission by the factor of 4. This mode of operation provides for
- an adjustment of a fixed gear ratio in an electric bicycle without freewheel,
- an adjustment of the amplification of the pedaling power of the user with a fixed gear ratio,
- an adjustment of the amplification of the pedaling power of the user with a variable, chosen gear ratio each by means of an input and display device 9 in the form for example of an interface configured as a turning handle, rocker switch or touch-sensitive display.

In the operating mode "fitness bicycle" the hybrid drive amplifies or attenuates the torque applied by the user on the pedal crank axle 5 via the second electric motor 3 so that it is possible to choose the user power independent of the driving condition. When driving downhill, for example, the user thereby can keep pedaling in order to constantly load himself for an optimum training, wherein the excess energy applied by the user is fed back into the accumulator 7 as electric energy.

In the operating mode "rehabilitation bicycle" for a cardio training the electromotive drive power is controlled by the pulse or heart rate of the patient, which preferably is wirelessly transmitted to a receiver integrated into the control device 8 or input and display device 8 by means of a transmitter attached to the patient and detecting the pulse or heart rate of the patient, so that by a corresponding adaptation of the electromotive drive power a constant load of the patient is achieved.

For detecting the torque output by the user to the pedal crank axle 5 the Q component of the motor current of the field-oriented controlled first electric motor 2 minus the Q component of the motor current of the field-oriented controlled second electric motor 3 is used by taking account of the gear ratios ü1 and ü2 of the first and second electric motors 2, 3 and the gear ratio $\ddot{u}_p$ of the planetary transmission 4, corresponding to $$M_{user} = \frac{3}{2}(\Psi_{M1ds}i_{sq} - \Psi_{M1qs}i_{sd})\ddot{u}p * \ddot{u}1 - \frac{3}{2}(\Psi_{M2ds}i_{sq} - \Psi_{M2qs}i_{sd})\ddot{u}2$$

wherein the gear ratio of the planetary transmission is $$\ddot{u}p = \frac{1+Z_h}{Z_s}$$

with Zh representing the number of teeth of the internal gear 44, Zs the number of teeth of the sun gear 41 of the planetary transmission 4, $\psi_{M1}$ the flux of the first electric motor 2, $\psi_{M2}$ the flux of the second electric motor 3 as well as $i_{sq}$ and $i_{sd}$ the flows in rotor coordinates of the field-oriented control.

LIST OF REFERENCE NUMERALS

1 housing
2 first electric motor
3 second electric motor
4 planetary transmission
5 pedal crank axle
6 sprocket
7 accumulator
8 control device
9 input and display device
10 rotor position encoder
21 first spur gear
22 first gear wheel
31 second spur gear
32 second gear wheel
41 sun gear
42 planetary gear
43 planetary gear carrier
44 internal gear
51, 52 pedal crank receptacles
Zh number of teeth of the internal gear
Zs number of teeth of the sun gear
$\psi_{M1}$ flux of the first electric motor
$\psi_{M2}$ flux of the second electric motor
$i_{sq}, i_{sd}$ flows in rotor coordinates of the field-oriented control

The invention claimed is:

1. A hybrid drive for an electric bicycle comprising a pedal crank drive which contains a pedal crank axle connected to pedal cranks at both ends, an electromotive drive electrically connected to an accumulator with a first and a second electric motor, which are connected to different transmission elements of a superposition transmission, which on a drive side is connected to the pedal crank drive and on an output side is connected to a sprocket of a chain drive of the electric bicycle, wherein the first and the second electric motor are configured identically and are arranged parallel to the pedal crank axle, the first electric motor is connected to a first spur gear of a first reduction gear and the second electric motor is connected to a second spur gear of a second reduction gear, wherein the first and the second spur gear have a different number of teeth and mesh with a first or second gear wheel of the first or second reduction gear arranged coaxially to the pedal crank axle, wherein the superposition transmission includes a planetary transmission with a sun gear, an internal gear arranged coaxially to the sun gear, and at least one planetary gear in engagement with the sun gear and the internal gear and rotatably arranged on a planetary gear carrier, that the first gear wheel is connected to the sun gear and the second gear wheel is connected to the pedal crank axle, which is coupled to the planetary gear carrier, and wherein, on the output side, the internal gear of the planetary transmission is connected to the sprocket.

2. The hybrid drive according to claim 1, further comprising a rotor position encoder connected to the pedal crank axle for detecting the pedaling frequency and direction of rotation of the pedal crank drive actuated by a user.

3. The hybrid drive according to claim 2, wherein the rotor position encoder consists of an optical or magnetic sensor that contains the second gear wheel of the second reduction gear connected to the pedal crank axle as a position encoder.

4. The hybrid drive according to claim 1, further comprising a control device supplied with the actual values of the electric motors and outputting setpoint values to the electric motors and connected to an input and display device, by means of which different operating modes of the bicycle with and without freewheel and/or backpedal function are adjustable.

5. The hybrid drive according to claim 4, wherein the control device is programmable and the input and display device consists of a turning handle which may be arranged on a handlebar of the bicycle, a rocker switch or a touch-sensitive display.

6. A hybrid drive for an electric bicycle comprising a pedal crank drive which contains a pedal crank axle connected to pedal cranks at both ends, an electromotive drive electrically connected to an accumulator with a first and a second electric motor, which are connected to different transmission elements of a superposition transmission, which on a drive side is connected to the pedal crank drive and on an output side is connected to a sprocket of a chain drive of the electric bicycle, wherein the first and the second electric motor are configured identically and are arranged parallel to the pedal crank axle, the first electric motor is connected to a first spur gear of a first reduction gear and the second electric motor is connected to a second spur gear of a second reduction gear, wherein the first and the second spur gear have a different number of teeth and mesh with a first or second gear wheel of the first or second reduction gear arranged coaxially to the pedal crank axle, wherein the superposition transmission includes a planetary transmission with a sun gear, an internal gear arranged coaxially to the sun gear, and at least one planetary gear in engagement with the sun gear and the internal gear and rotatably arranged on a planetary gear carrier, the first gear wheel is connected to the sun gear and the second gear wheel is connected to the pedal crank axle, which is coupled to the internal gear, and, on the output side, the planetary gear carrier of the planetary transmission is connected to the sprocket.

7. The hybrid drive according to claim 6, further comprising a rotor position encoder connected to the pedal crank axle for detecting the pedaling frequency and direction of rotation of the pedal crank drive actuated by a user.

8. The hybrid drive according to claim 7, wherein the rotor position encoder consists of an optical or magnetic sensor that contains the second gear wheel of the second reduction gear connected to the pedal crank axle as a position encoder.

9. The hybrid drive according to claim 6, further comprising a control device supplied with actual values of the electric motors and outputting setpoint values to the electric motors and connected to an input and display device, by means of which different operating modes of the bicycle with and without freewheel and/or backpedal function are adjustable.

10. The hybrid drive according to claim 9, wherein the control device is programmable and the input and display device consists of a turning handle which may be arranged on a handlebar of the bicycle, a rocker switch or a touch-sensitive display.

11. A method for operating a hybrid drive for an electric bicycle including a hybrid drive for an electric bicycle including a pedal crank drive which contains a pedal crank axle connected to pedal cranks at both ends, an electromotive drive electrically connected to an accumulator with a first and a second electric motor, which are connected to different transmission elements of a superposition transmission, which on a drive side is connected to the pedal crank drive and on an output side is connected to a sprocket of a chain drive of the electric bicycle, wherein the first and the second electric motor are configured identically and are arranged parallel to the pedal crank axle, the first electric motor is connected to a first spur gear of a first reduction gear and the second electric motor is connected to a second spur gear of a second reduction gear, wherein the first and the second spur gear have a different number of teeth and mesh with a first or second gear wheel of the first or second reduction gear arranged coaxially to the pedal crank axle, comprising operating modes drive of the electric bicycle by actuating the pedal crank drive with and without support by the electromotive drive, drive of the electric bicycle by the electromotive drive, stepless change of the gear ratio of the drive train from the pedal crank drive to a sprocket by means of the electromotive drive, electromotive braking of the electric bicycle, recuperative electromotive braking of the electric bicycle with charging of the accumulator, wherein the torque output by a user to the pedal crank axle correspondingly is determined from the Q component of the motor current of the field-oriented controlled first electric motor minus the Q component of the motor current of the field-oriented controlled second electric motor by taking account of the gear ratios of the electric motors and a gear ratio of the planetary transmission, corresponding to $$M_{user} = \frac{3}{2}(\Psi_{M1ds}i_{sq} - \Psi_{M1qs}i_{sd})\ddot{u}p * \ddot{u}1 - \frac{3}{2}(\Psi_{M2ds}i_{sq} - \Psi_{M2qs}i_{sd})\ddot{u}2$$

wherein $$\ddot{u}p = \frac{1+Zh}{Zs}$$

with Zh representing a number of teeth of an internal gear, Zs a number of teeth of a sun gear of the planetary transmission, $\psi_{M_1}$ a flux of the first electric motor, $\psi M_2$ a flux of the second electric motor, $i_{sq}$ and $i_{sd}$ flows in rotor coordinates of the field-oriented control.

12. The method according to claim 11, wherein the operating modes are adjusted by the user of the electric bicycle on the input and display device connected to the control device or are specified by the kind of actuation of the electric bicycle by the user.

13. The method according to claim 12 for an electric bicycle without freewheel function, wherein the intensity of the recuperative braking is varied by the intensity of a counter torque exerted by the user on pedals of the pedal cranks against a direction of rotation of the pedal crank drive for a forward movement and/or by a backpedal force exerted on the pedals of the pedal cranks.

14. The method according to claim 11, wherein the power output by the user to the pedal crank drive is adjusted independent of the respective driving condition of the electric bicycle, and in dependence on the respective driving condition of the electric bicycle in a motor mode drive power is output from the electromotive drive to the sprocket or in a generator mode electric power is output from the electromotive drive to the accumulator.

15. The method according to claim 11, wherein the recuperating braking involves the build-up of a rising pedal reaction moment via the second electric motor by turning back the pedal crank drive from standstill, which pedal reaction moment corresponds to a braking moment, wherein the recuperation of electric energy is effected via the first electric motor operating in a generator mode.

16. The method according to claim 11, wherein the amplification of the power output by the user to the pedal crank axle is adjusted by means of the input and display device by taking account of gear ratio set at the input and display device.

17. The method according to claim 11 for an electric bicycle without freewheel function, wherein a mechanical freewheel is reproduced by determining the position of a rotor of the second electric motor and by tracking the rotational speed of the sprocket connected to a rotor of the first electric motor.

\* \* \* \* \*